(12) United States Patent
Lisec

(10) Patent No.: US 7,252,188 B2
(45) Date of Patent: Aug. 7, 2007

(54) DEVICE AND METHOD FOR DISPLACING GLASS PLATES DURING THE MACHINING OF THE SAME

(76) Inventor: Peter Lisec, Bahnhofstrabe 34, Amstetten-Hausmening (AT) A-3363

( * ) Notice: Subject to any disclaimer, the term of this patent is extended or adjusted under 35 U.S.C. 154(b) by 191 days.

(21) Appl. No.: 10/506,105

(22) PCT Filed: Nov. 22, 2002

(86) PCT No.: PCT/IB02/05781

§ 371 (c)(1),
(2), (4) Date: Mar. 2, 2005

(87) PCT Pub. No.: WO2004/048284

PCT Pub. Date: Jun. 10, 2004

(65) Prior Publication Data

US 2005/0126882 A1   Jun. 16, 2005

(51) Int. Cl.
*B65G 29/00* (2006.01)
(52) U.S. Cl. .................. 198/474.1; 198/470.1
(58) Field of Classification Search ............ 198/474.1, 198/476.1, 470.1, 406, 836.1, 782
See application file for complete search history.

(56) References Cited

U.S. PATENT DOCUMENTS

| | | | |
|---|---|---|---|
| 3,834,885 A * | 9/1974 | Frank | 65/106 |
| 3,870,500 A * | 3/1975 | Jack et al. | 65/273 |
| 4,199,341 A | 4/1980 | Petrella | |
| 5,380,348 A * | 1/1995 | Boaz | 65/25.2 |
| 6,808,358 B1 * | 10/2004 | Mayerberg et al. | 414/676 |
| 6,923,309 B2 * | 8/2005 | Costanzo | 198/411 |

* cited by examiner

*Primary Examiner*—Joe Dillon, Jr.
(74) *Attorney, Agent, or Firm*—Young & Thompson

(57) ABSTRACT

A device for machining a glass plate (5) is provided with a lifting element (10,11) which is used to lift the glass plate (5) from a transport device (3) located on a lower edge of a supporting wall (1), during the machining process. The lifting element (10,11) includes lifting fingers (10) provided with clips (15) which can be applied to the lower horizontal edge (7) of the glass plate (5), in order to positively connect the lifting element (10,11) to the glass plate (5). Both a drive for lifting and lowering the lifting element and a drive for horizontally displacing the same are associated with the lifting element (10,11), such that the glass plate (5) can be displaced during the machining process, without slipping and without any time delay.

19 Claims, 6 Drawing Sheets

DEVICE AND METHOD FOR DISPLACING GLASS PLATES DURING THE MACHINING OF THE SAME

Figure 1:
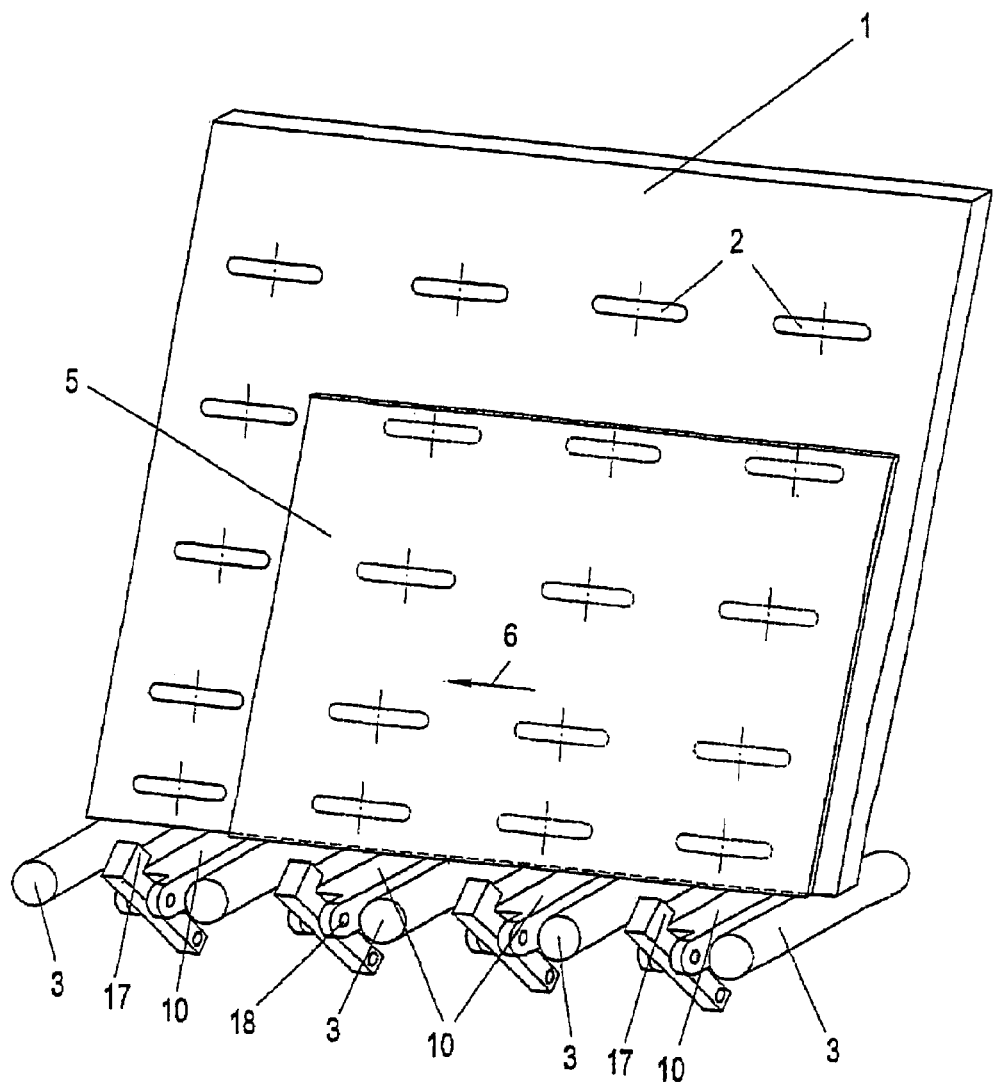

The invention relates to a device with the features of the introductory part of claim 1.

The invention furthermore relates to a device for transport of a glass sheet which is to be worked.

When glass sheets are being worked, it is necessary or at least desirable for the glass sheets to be moved by exactly defined distances and at the proper time to allow precision working.

This applies especially to the cutting of glass sheets using a water jet, as is described for example in EP 1 110 686 A. When glass sheets are to be cut using a water jet according to contours with any, therefore also curved outline shapes, it is especially important for the glass sheet to be moved in an exactly defined manner as it is being worked (cutting using a water jet) in order to traverse the given contour with the water jet in combination with movements of the nozzle from which the water jet is directed against the glass plate. In doing so changes of the direction of movement of the glass sheet are often necessary.

What was stated above for cutting of glass sheets with a water jet also applies to the working of cut edges, for example those which have been produced by water jet cutting, by grinding with (diamond) grinding heads, in order to break or trim the cut edges. In this working what is important is to move the glass sheet exactly relative to the grinding tool.

Simple belt or roller conveyors are not able to accomplish these movements with sufficient precision, since both when braking and also when accelerating slippage inevitably occurs between the conveyor belts and the conveyor rollers which are provided with elastic jackets, and the glass sheet. It was therefore proposed in EP 1 110 686 A that an entrainment device equipped with a suction head be allowed to engage the glass sheet which is to be cut using the water jet, as is known in principle from EP 0 123 009 A.

In any case such means which operate using suction heads for supporting the movements of glass sheets have proven disadvantageous since the suction head of the entrainment device is often "in the way" for working of the glass sheet so that where the suction head engages the glass sheet the latter cannot be worked.

U.S. Pat. No. 5,086,907 A discloses a device for transporting arched glass sheets which are lying horizontally, which device is equipped with a so-called walking beam conveyor.

DE 37 18 859 A discloses a holding device for plate-shaped articles in which the articles are arranged on end. This holding device has clamping jaws which are tensioned against one another by springs in order to fix the articles between them by friction.

The object of the invention is to make available a device and a process of the initially mentioned type with which glass sheets, even if they are large and heavy, can be moved with precision while they are being worked. In particular the device will also be suitable for moving glass sheets when they are cut using a water jet or when edges or cutouts in glass sheets are cut or trimmed by a grinding head.

This object is achieved as claimed in the invention with a device and a process with the features of the independent claims.

Preferred and advantageous embodiments of the device as claimed in the invention are the subject matter of the dependent claims.

In the device as claimed in the invention the glass sheet is raised using a lifting device off the conveyor means, for example the conveyor rollers, while it is leaning on the support wall and after inducing a non-positive connection between the lifting means and the glass sheet, the latter is moved precisely and without slip by the lifting means by the distance required at the time in the direction required at the time.

The device as claimed in the invention is intended especially to move glass sheets precisely in the horizontal direction; this is not possible with the movement of a glass sheet practiced in the past using conveyor rollers, since each time movement begins and each time movement ends slip occurs between the glass sheet and the conveyor means, for example belt conveyors or conveyor rollers which are coated with soft plastic (rubber-like).

Especially in devices for cutting of glass sheets using a water jet (water jet cutting) or when working glass sheets in order to grind their edges or the edges of cutouts in them, a host of movements of the glass sheets which are to be exactly executed in the horizontal direction are necessary so that in combination with vertical movements of the nozzle from which the water jet emerges, or of the grinding head, contours with any outline shape can be cut or worked by removal (grinding).

In one preferred embodiment the lifting means is made essentially rake-shaped, the glass sheets being lifted off the conveyor means by the lifting fingers which project from the base beam of the lifting means.

The non-positive connection between the lifting means and the glass sheet can be achieved in one embodiment by there being clamps on the lifting fingers, which clamps are placed against the lower edge of the glass sheet in order to cause the non-positive connection between the lifting means and the glass sheet.

The preferred devices can be combined into transport devices which are composed of several devices. Here the devices are arranged in succussion such that a glass sheet which is to be worked can be moved from one device to the adjacent device depending on the requirement. In this way the lower horizontal edge of the glass sheet can also be worked. In particular the lower horizontal edge of the glass sheet can be ground or can be provided with recesses. The working of the lower horizontal edge takes place in a segment of the lower horizontal edge which is not occupied by the lifting means.

Transfer from one device to the adjacent device takes place such that the glass sheet which is to be worked is always fixed in at least one of the lifting means during the working process. In this way the position of the glass sheet with respect to the working tool is defined during the working process since the glass sheet is transferred without slip or play from one device for working of the glass sheets to the adjacent device.

Other details, features and advantages of the invention arise from the following description of one embodiment for a device as claimed in the invention which is shown schematically in the drawings.

Figure 2:
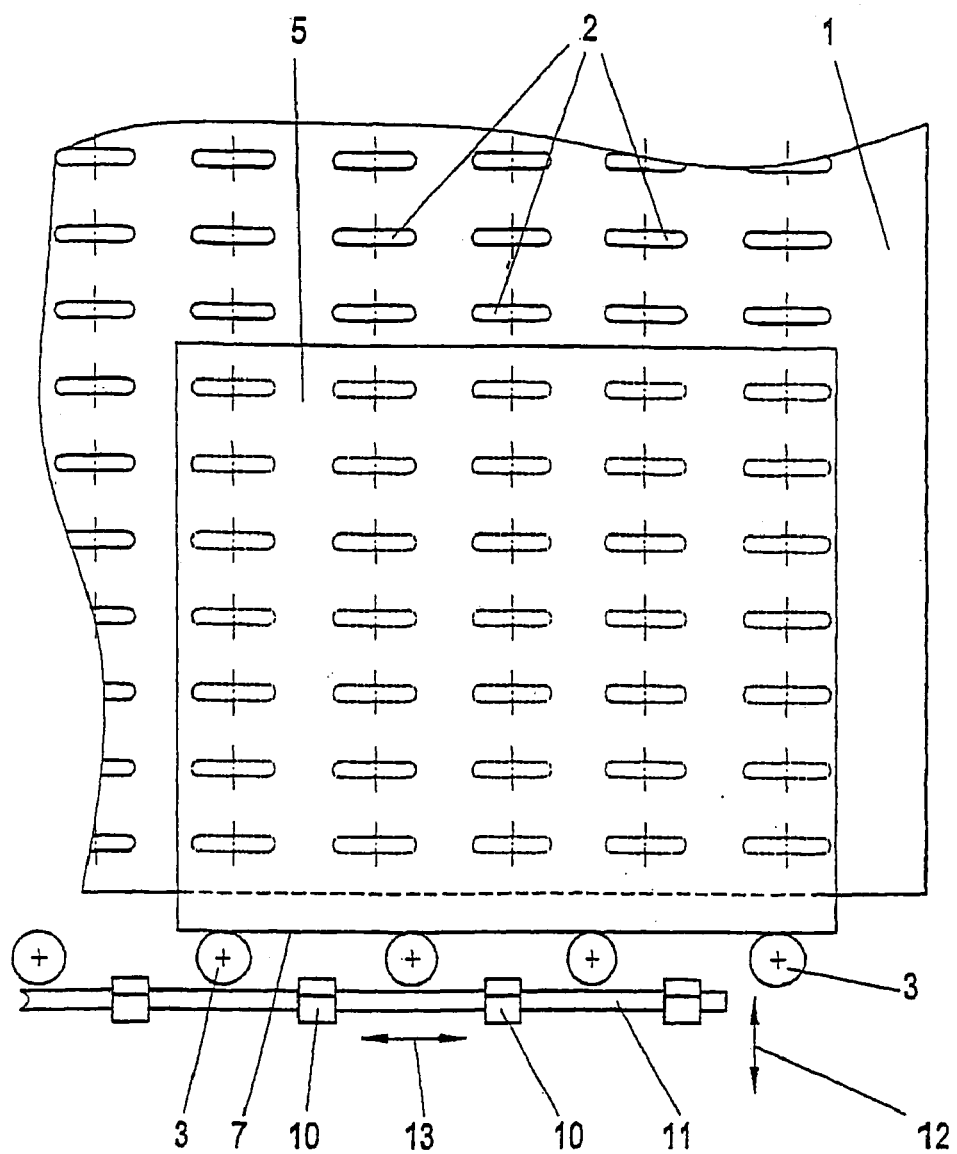
Figure 3:
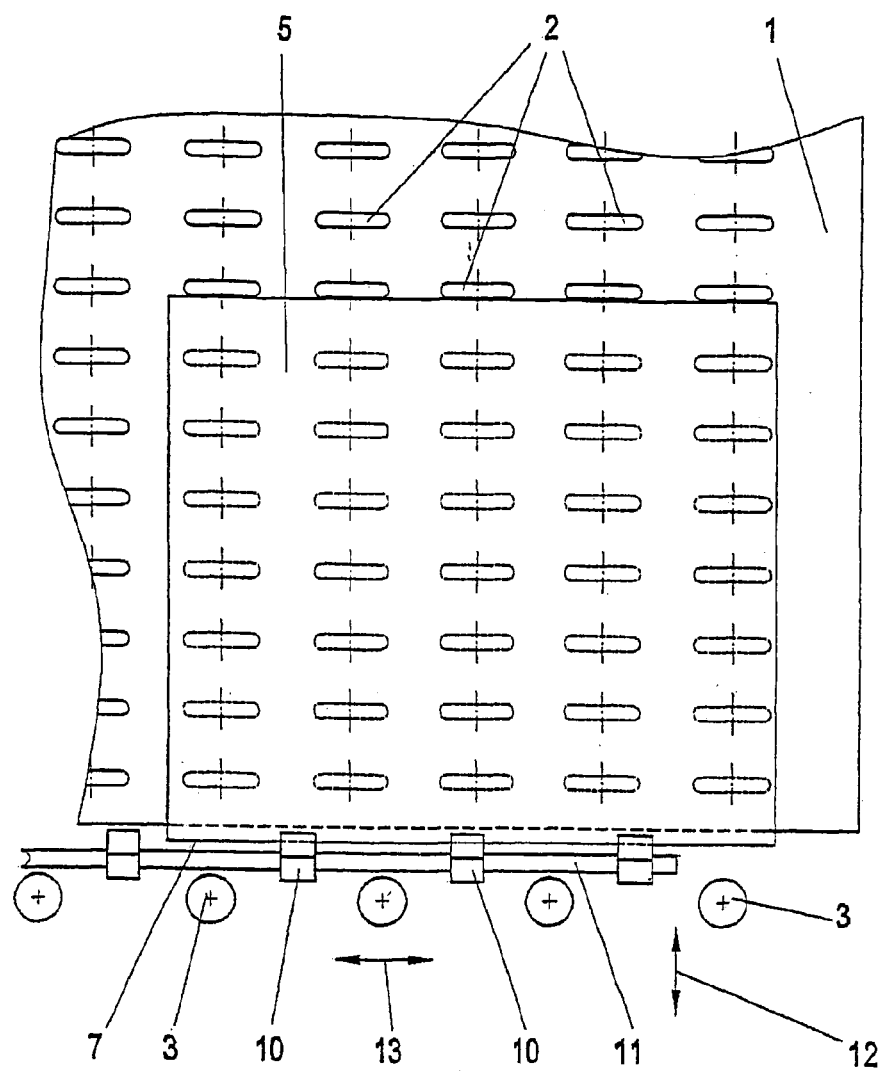
Figure 4:
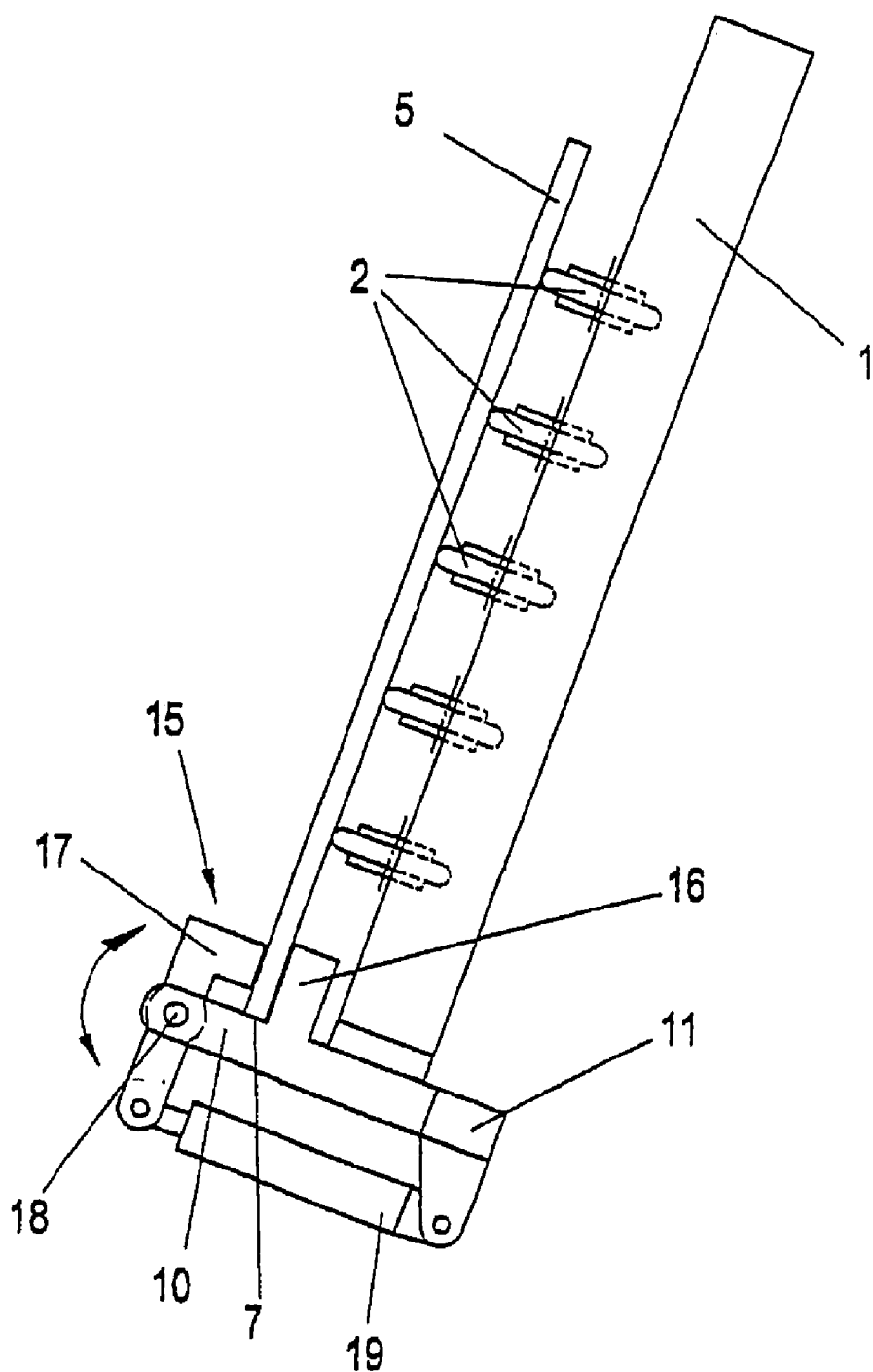
Figure 5:
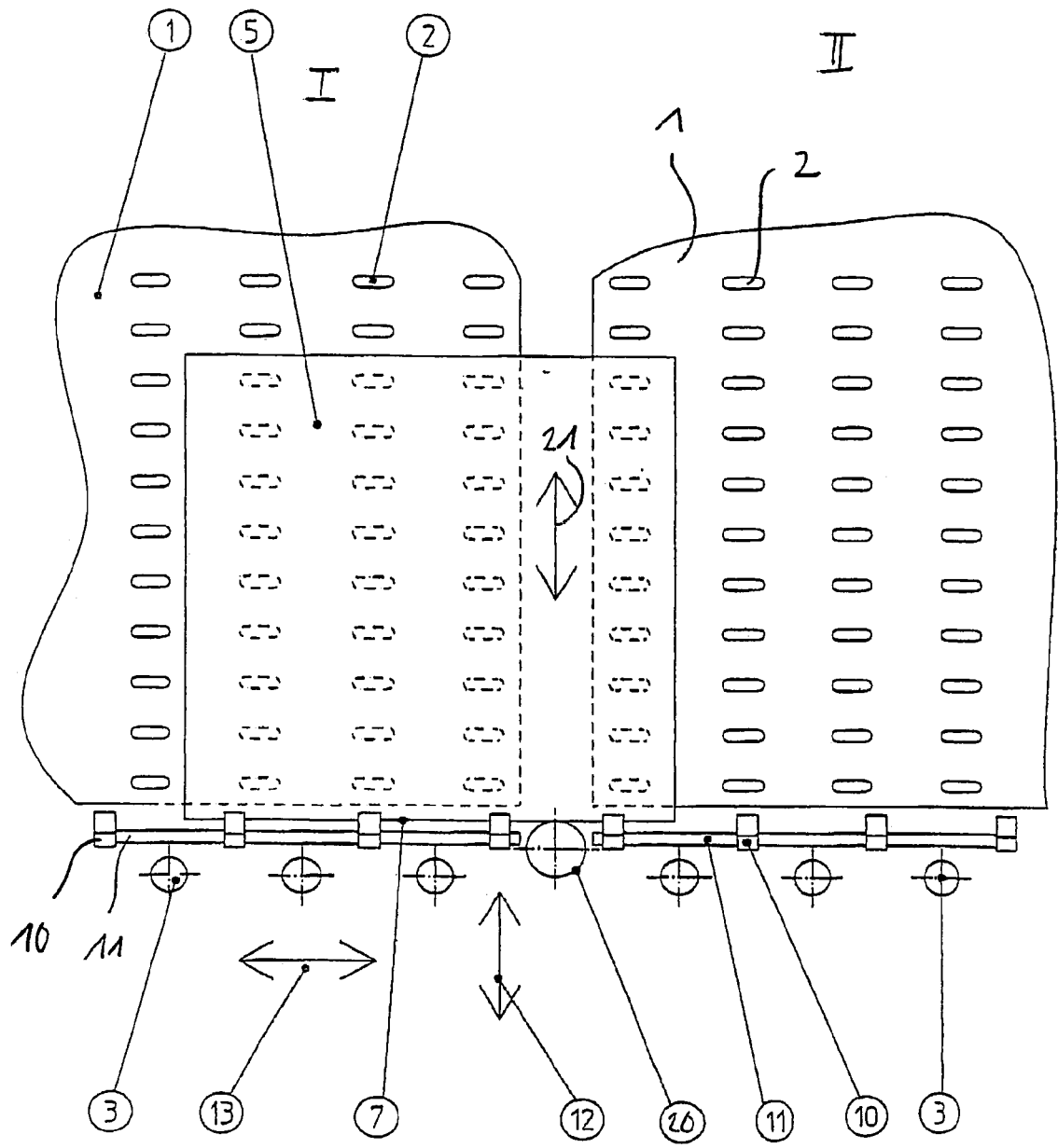

FIG. 1 shows a part of the device as claimed in the invention in an oblique view, FIG. 2 shows a front view thereof, FIG. 3 shows a view of the device with a glass sheet raised off the conveyor rollers, FIG. 4 shows a side view thereof, FIG. 5 shows a front view of the transport device which is composed of two devices which are shown in FIG. 1 to FIG. 4, and FIG. 6 shows a front view of the second device from FIG. 5.

The device as claimed in the invention has a support wall 1 which is tilted at the top somewhat to the rear, as is conventional in the glass domain. In the support wall 1 there are several support rollers 2 which are uniformly distributed over the surface of the support wall 1, which can be turned freely around an essentially vertical axis and which are equipped with an elastic thrust ring.

Basically any other type of support of the glass sheet 5 of the support wall 1 is possible, for example, support rolls, air cushions, or the like.

On the lower edge of the support wall 1 there is a conveyor means in the form of a row of conveyor rollers 3 which are driven in rotation around the axes which are perpendicular to the plane of the support wall 1. Although in the embodiment the conveyor means consists of conveyor rollers 3, it is considered that the conveyor means consisting of conveyor rollers 3 in this embodiment can be formed on the lower end of the support wall 1 also by a row of conveyor belts or by a conveyor belt which is deflected down at certain intervals to under the upper strand.

A glass sheet 5 is transported standing on the conveyor rollers 3 and leaning supported against the support wall 1 via the support rollers 2 (direction arrow 6). The transport of a glass sheet 5 using the conveyor rollers 3 is used preferably for delivery of a glass sheet 5 which is to be worked and to remove it after it is worked.

The situation with the glass sheet 5 standing upright on the conveyor rollers 3 and leaning on the support rollers 2 is shown again in FIG. 2 (front view).

Like FIG. 1, FIG. 2 shows that between each conveyor roller 3 there is a lifting finger 10 which is first located at a distance underneath the lower horizontal edge 7 of a glass sheet 5 which is standing on the conveyor rollers 3. The lifting fingers 10 are located on a common beam 11 which together with them form a "lifting means" which can be moved both essentially vertically (parallel to the plane of the support wall 1; arrow 12) and also horizontally (arrow 13).

When the conveyor means is a series of belt conveyors, the lifting fingers 10 of the lifting means are each located between adjacent conveyor belts. In a conveyor belt which is deflected down in areas, there are lifting fingers 10 where the conveyor belt is deflected down.

First the beam 11 with the lifting fingers 10 (the lifting means which is comprised of the beam 11 and the lifting fingers 10 is made essentially in the manner of a rake) is raised in the direction of the arrow 12 until the lifting fingers 10 with their surfaces which point up run up from underneath on the lower edge 7 of the glass sheet 5 and lift it off the conveyor rollers 3 as it continues to be lifted. The situation with the raised glass sheet 5 is shown in FIGS. 3 and 4.

In order to join the glass sheet 5 to the lifting fingers 10 of the lifting means (non-positively) there is a clamp 15 on individual lifting fingers 10 or on each lifting finger (see FIG. 4). These clamps 15 clamp the lower edge of the glass sheet 5 so that it follows, without slip, the horizontal movements (arrow 13) of the lifting means (beam 11 and lifting finger 10) when the glass sheet 5 is being worked and is to be moved for this purpose (horizontally, back and forth).

In particular the clamp 15 can be swivelled on each lifting finger 10 out of a jaw 16 which is joined fixed to the lifting finger 10 and a clamp jaw 17 which is supported on the free end of the lifting finger 10 (axis 18). The jaws 16 and 17 can be provided on their areas which adjoin the glass sheet 5 in the clamped position with supports of elastic material.

To actuate the clamping jaws 17 which can be swivelled around the axes 18 a hydraulic cylinder 19 is assigned to each clamp 15, is supported in the area of the beam 11 and engages the extension of the clamp jaw 17 which projects beyond the swivelling axis 18.

To move the lifting means consisting of the lifting fingers 10 and the beam 11 there can be any linear drives. Rack-and-pinion drives or spindle drives are preferred.

If the lift in the direction of the arrow 13 when a glass sheet 5 is being worked (for example, in water jet cutting) has to be larger than the maximum lift of the lifting means, the lifting means can be lowered, the glass sheet 5 settled on the conveyor rollers 3 and the lifting means can be lifted again after the lifting means moves back into its initial position ("drawback motion") so that again the situation of FIGS. 3 and 4 is reached and renewed movement of the glass sheet 5 in the desired direction is possible.

In summary, one preferred embodiment of the device can be described as follows.

In a device for working of a glass sheet 5 there is a lifting means 10, 11 with which the glass sheet 5 while working can be lifted off the conveyor means 3 which is provided on the lower edge of a support wall 1. The lifting means 10, 11 has lifting fingers 10 on which there are clamps 15 which can be placed against the lower horizontal edge 7 of the glass sheet 5 in order to non-positively join the glass sheet 5 to the lifting means 10, 11. The lifting means 10, 11 is assigned not only one drive for raising and lowering it, but also a drive for its horizontal movement so that the glass sheet 5 can be moved without slippage and without time delay as it is being worked.

The device which is described using FIGS. 1 to 4 can be combined in the transport device which is shown in FIG. 5. This transport device in sections I and II has one of the devices which is shown using FIGS. 1 to 4. Here the same reference numbers in sections I and II designate parts which correspond to one another. As in the device in section I the device in section II has a support wall I which is provided with support rollers 2. Moreover the device in section II comprises a lifting means 10, 11 with lifting fingers 10 which are attached to a beam 11.

FIG. 5 shows a front view of the transport device which has section I and II at the time at which the glass sheet 5 is being transferred from section I into section II. The transfer process takes place as follows.

First the glass sheet 5 on the conveyor rollers 3 runs into section I. Then the lifting means 10, 11 in section I is raised and the glass sheet 5 is held non-positively using the lifting fingers 10. The conveyor rollers 3 are thereupon lowered so that the glass sheet 5 is guided in section I by the lifting means 10, 11.

A free-standing section of the lower horizontal edge 7 of the glass sheet 5 can now be worked using a working tool 20, for example, a diamond grinding wheel, or using a water jet tool. The working tool 20 can be moved between the sections I and II in the direction of the arrow 21. To work the lower horizontal edge 7 of the glass sheet 5 the working tool 20 is however in the position shown in FIG. 5.

While the lower horizontal edge 7 of the glass sheet 5 is being worked by the working tool 20, the lifting means 10, 11 moves as far as possible up to the working-tool 20. The free-standing section of the horizontal edge 7 then projects into section II of the transport device. In order to support the glass sheet 5, at this instant the conveyor rollers 3 in section II are raised in order to prevent the glass sheet 5 from being detached from the lifting means 10, 11 in section I. After the free-standing section of the horizontal edge has been worked, the lifting means 10, 11 in section II is raised and the glass sheet 5 is fixed in section II using the lifting means 10, 11. The conveyor rollers 3 in section II are thereupon lowered and the conveyor rollers in section I are raised. The lifting means 10, 11 in section I can now be released and lowered so that it is possible to pull the glass sheet 5 which is resting on the conveyor rollers 3 in section I into section II. As a result it is also possible now to work the remaining section of the horizontal edge 7 using the working tool 20.

In doing so, under certain circumstances the problem arises that the adjustment path of the lifting means 10, 11 in section II is not enough to work the entire remaining lower horizontal edge 7 of the glass sheet 5. The lifting means 10, 11 in sections I and II are however also able to encompass it. This is explained by way of example using FIG. 6.

Encompassing by the lifting means 10, 11 on the glass sheet 5 is carried out by for example in section II the conveyor rollers 3 being raised and by the glass sheet 5 being settled on the conveyor rollers 3. In another process step the lifting means 10, 11 are set down and moved in a suitable manner in the direction of the arrow 13. Then the lifting means 10, 11 in section II is raised again and the glass sheet 5 is fixed in the lifting means 10, 11. After lowering the conveyor rollers 3 in section II the glass sheet 5 can be moved again along the support wall 1 guided by the lifting means 10, 11.

Figure 6:
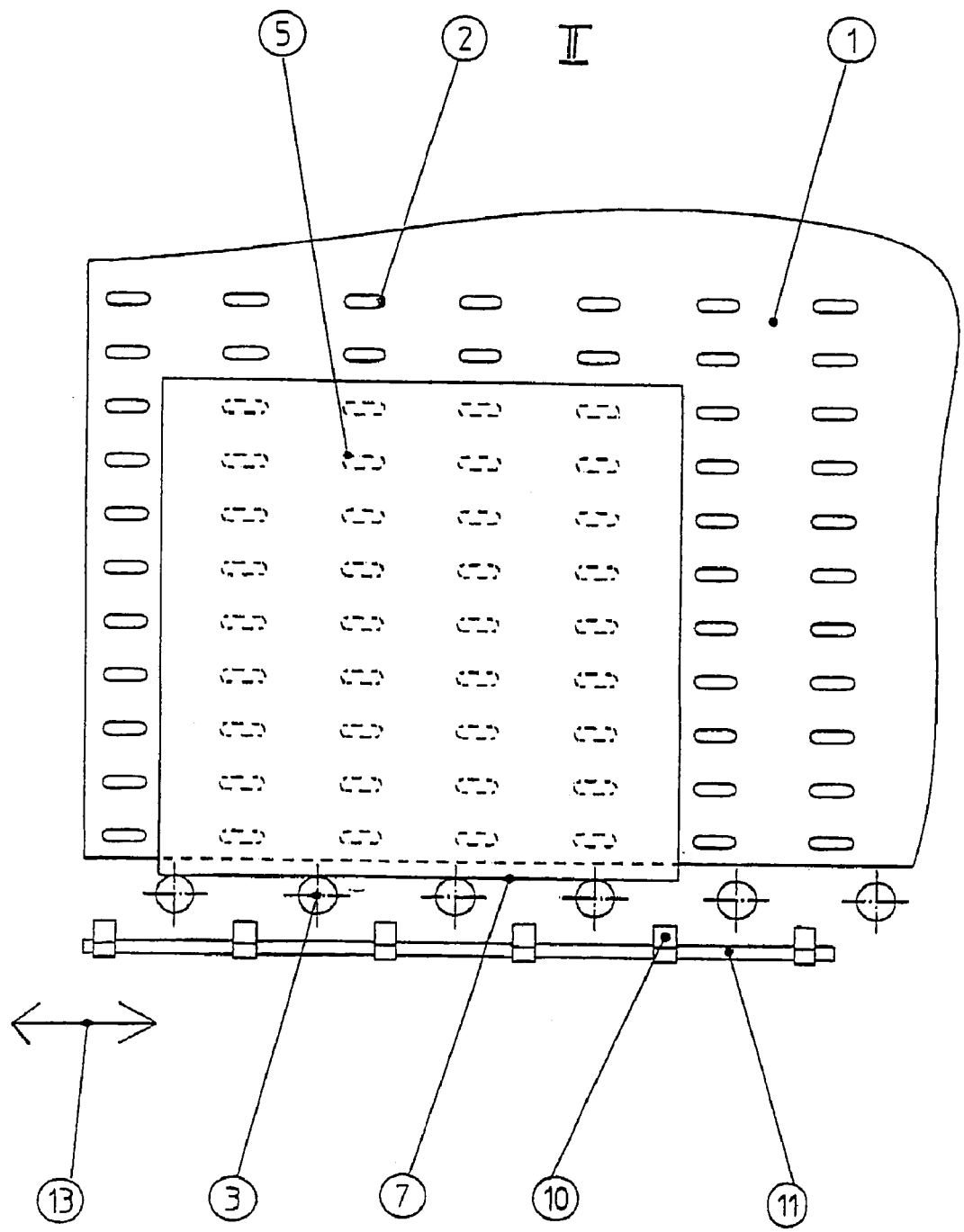

As in the transfer process shown in FIG. 5, the encompassing process shown in FIG. 6 takes place without slip or play since the glass sheet 5, while the lifting means 10, 11 is released from the glass sheet 5, rests on the conveyor rollers 3. The lifting means can therefore hold the glass sheet 5 in the same position in which the lifting means 10, 11 had set it down.

It should be noted that using the transport device shown in FIGS. 5 and 6 glass sheets can be worked on all sides and over the surface up to a length of roughly 10 meters. The working of the glass sheets 5 on the edges takes place using grinding tools or using a water jet. The glass sheet 5 is worked over the surface preferably using a water jet.

The invention claimed is:

1. Device for working of glass sheets (5) with a support wall (1) and a conveyor means (3) which is provided on the lower edge of the support wall and on which a glass sheet (5) stands upright with its lower horizontal edge while it is leaning on the support wall (1), characterized in that a lifting means (10, 11) which can be fixed on the glass sheet (5) is assigned to the lower edge of the support wall (1), that the lifting means (10, 11) can be raised out of the readiness position which is underneath the conveyor means (3) into an action position which is raised relative to the conveyor means (3), and wherein the lifting means (10, 11) is assigned a drive for moving the lifting means (10, 11) in at least one direction (arrow 13) in the plane of the support wall (1).

2. Device as claimed in claim 1, wherein the lifting means is made essentially rake-like with a base beam (11) and several lifting fingers (10) which project from it.

3. Device as claimed in claim 1, wherein there is at least one lifting finger (10) of the lifting means (10, 11) at a time between adjacent sections of the conveyor means (3).

4. Device as claimed in claim 1, wherein the conveyor means is formed from a row of conveyor rollers (3) which are at least partially driven in rotation.

5. Device as claimed in claim 4, wherein the lifting fingers (10) of the lifting means are located between the conveyor rollers (3).

6. Device as claimed in claim 1, wherein the conveyor means is formed from a row of sections of conveyor belts.

7. Device as claimed in claim 6, wherein the sections of the conveyor means are a sequence of conveyor belts which are located at a distance from one another, the lifting fingers (10) being located between the sections of the conveyor belts.

8. Device as claimed in claim 6, wherein the sections of the conveyor means are formed by a continuous conveyor belt which is deflected down in the area of the lifting fingers (10) of the lifting means.

9. Device as claimed in claim 1, wherein on the lifting fingers (10) there are clamps (15) for fixing a glass sheet (5) on the lifting means (10, 11).

10. Device as claimed in claim 9, wherein the clamps (15) have two clamp jaws (16, 17) on the lifting fingers (10).

11. Device as claimed in claim 10, wherein at least one (16) of the clamp jaws (15, 16) is rigidly connected to the lifting finger (10).

12. Device as claimed in claim 10, wherein at least one (17) of the clamp jaws (17, 16) can be swivelled relative to the lifting finger (10).

13. Device as claimed in claim 9, wherein the clamps (15) of the lifting fingers (10) can be placed against the lower horizontal edge of a glass sheet (5).

14. Device as claimed in claim 9, wherein the surfaces of the clamp jaws (16, 17) of the clamps (15), which surfaces can be placed against the glass sheet (5) are provided with a support of elastic material.

15. Device as claimed in claim 12, wherein the movable clamp jaw (17) of the clamp (15) is supported to be able to swivel around an axis (18) on the end of the lifting finger (10) which is remote from the base beam (11) of the lifting means (10, 11).

16. Device as claimed in claim 1, wherein the drive for moving the lifting means is coupled to the base beam (11) of the lifting means (10, 11).

17. Device as claimed in claim 1, wherein there are separate drives for raising and lowering the lifting means (10, 11) on the one hand and for horizontal movement of the lifting means (10, 11) on the other.

18. Transport device characterized by at least two successive devices as claimed in claim 1.

19. Transport device as claimed in claim 18, wherein during a working process on the glass sheet (5) at least one lifting means (10, 11) can be fixed on the glass sheet (5) which is to be worked.

* * * * *